PUNCHED CARD READING SYSTEM

Filed May 8, 1961 2 Sheets-Sheet 1

HARLEY F. BEAN
INVENTOR.

BY D. Carl Richards

HARLEY F. BEAN
INVENTOR.
BY D. Carl Richards

United States Patent Office 3,187,166

Patented June 1, 1965

3,187,166

PUNCHED CARD READING SYSTEM

Harley F. Bean, Dallas, Tex., assignor, by mesne assignments, to Sperry Rand Corporation, New York, N.Y., a corporation of Delaware Filed May 8, 1961, Ser. No. 108,536
8 Claims. (Cl. 235—61.11)

This invention relates to a card-reading system and more particularly to precision card control in which a perforated card is moved in precise steps past a reading zone.

In systems adapted to sense the position of a hole at any one of a plurality of locations in a punched card the two dimensions of hole location are employed as a key to the magnitude of a given function represented on the card. In such systems it is necessary to synchronize a reading mechanism and a card-positioning mechanism.

Generally, the punched cards are in the form of rectangular cardboard sheets. Each card is divided into a plurality of information columns extending laterally across the card at spaced points along the length thereof. Each information column is divided into a predetermined number of zones in any one of which a hole may be punched depending upon the information to be recorded. In a typical example eighty information columns are provided in a card and each column is divided into twelve uniformly spaced zones at any one of which a hole may be punched. Such a card, when placed in a reading system, is advanced step-wise so that each of the information columns is placed in registration sequentially with a column of sensors. If a hole is present at a given location, a feeler or finger will extend through the perforation and close an electrical circuit which is a key to the information represented by the hole location.

The present invention is directed particularly to the synchronized positioning of punched cards in such a system.

More particularly, a card drive is provided in a card-reading system having a columnar reading including fingers for sensing perforations in each of a plurality of card information columns as a punched card is moved along a way past the reader. The card drive includes a plurality of elements each adapted to engage the trailing edge of a card placed in the card way. A carrier is mounted for movement adjacent to one side of the way and has a component of movement parallel to the length of the way. Independently adjustable mounting means are provided at each of a plurality of points spaced along the carrier for mounting the propelling elements thereon. Means are provided for advancing the carrier in uniform steps to move the elements along the way.

In a further aspect the card-moving elements are adjustable along the carrier as to predetermine the positions of the elements relative to the reader at the end of each step. The foregoing, together with means for adjusting the angularity of the travel path of the elements through the way such that the component of movement in the direction of card travel equals the spacing between the information columns, assures precise alignment between information columns and the columnar reader at the end of each step.

In a further aspect of the invention, applicant provides a card-advancing linkage which includes a prime mover adapted to produce an intermittent forward motion of a card-engaging element in a card-carrying way. Means are provided for adjusting the angularity of said motion such that the component of movement in the direction of card movement in the way is equal to the spacing between adjacent columns in said card. The card-engaging element is provided to extend into the way and moves in dependence upon said motion to propel said card step-wise through the way to bring successive ones of said columns sequentially into registration with a columnar reader adjacent the side of the way.

For a more complete understanding of the present invention and for further objects and advantages thereof, reference may now be had to the following description taken in conjunction with the accompanying drawings in which.

Figures 1, 2:
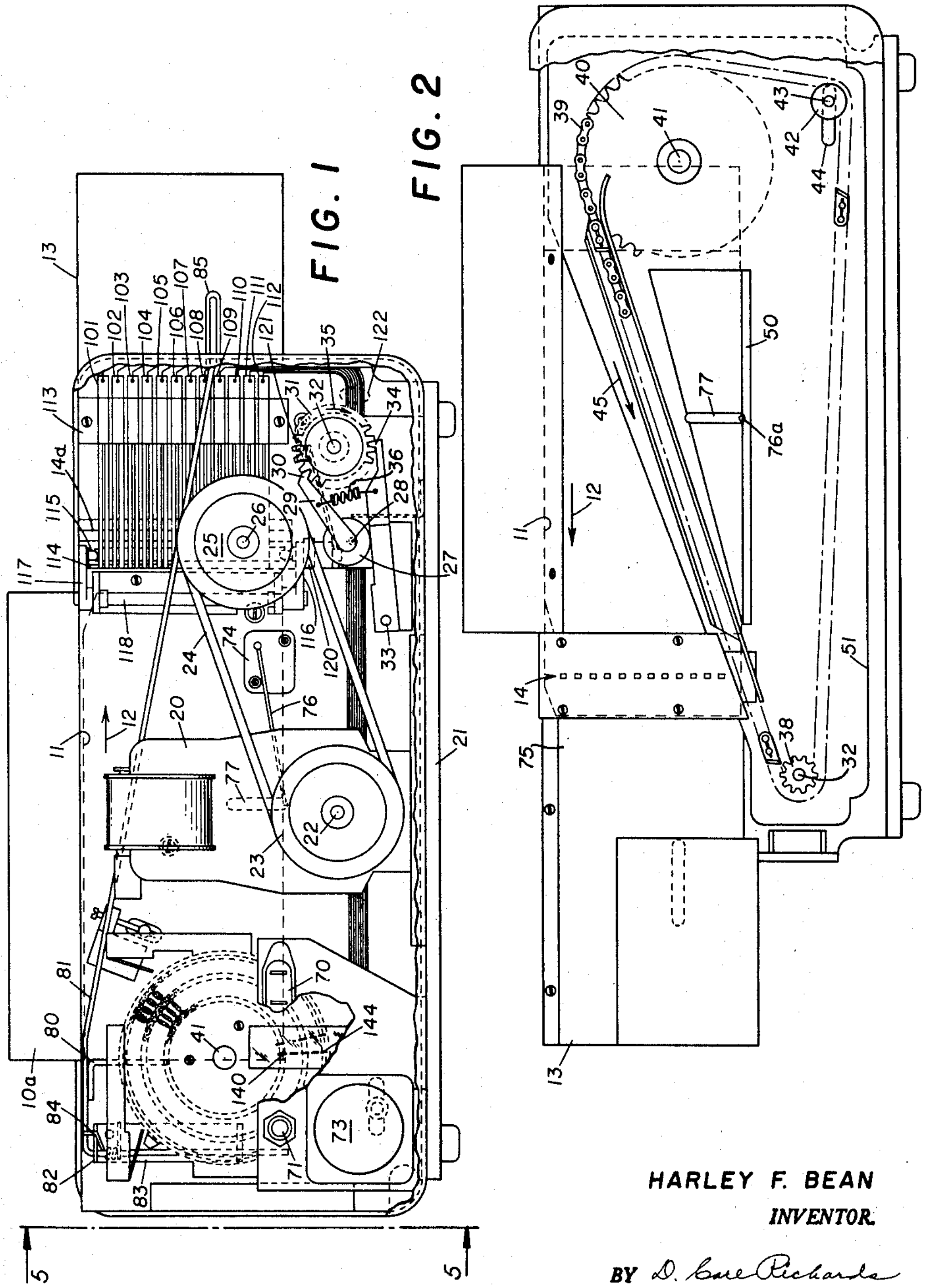
FIG. 1 is a front elevation view of the present invention.
FIG. 2 is a sectional view taken through the card-carrying slot along lines 2—2 of FIG. 5.
Figures 5, 6:
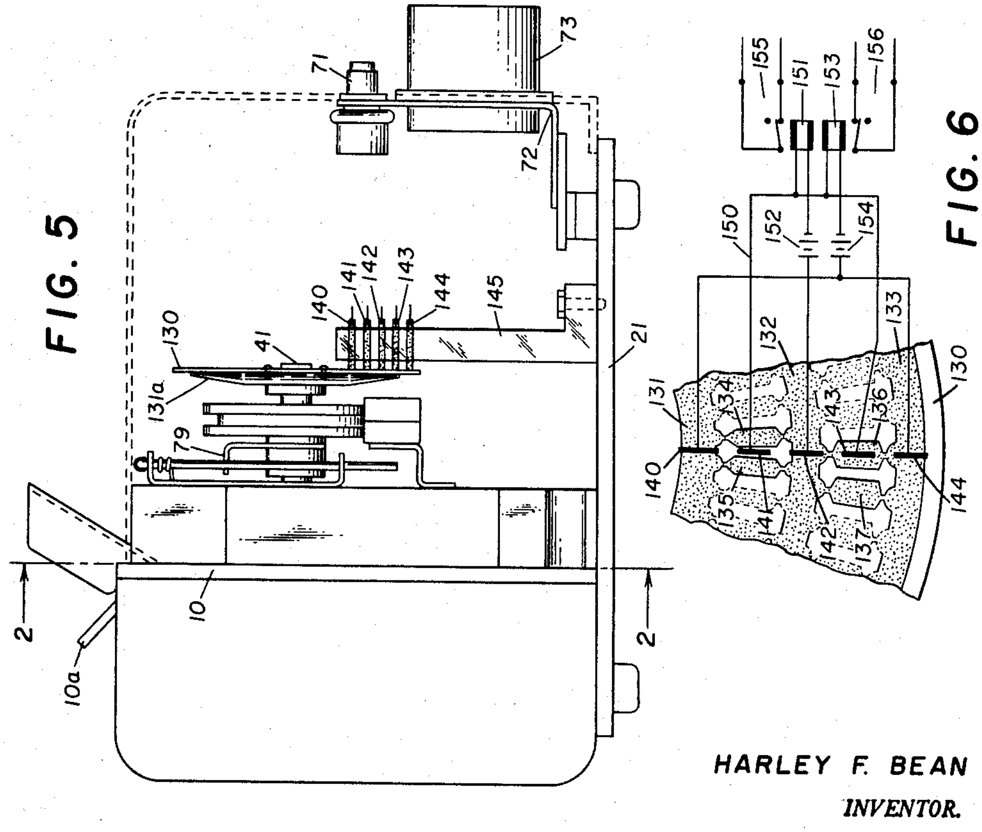
FIG. 5 is an end view of the card-reading system taken along the lines 5—5 of FIG. 1.
FIG. 6 is an enlarged view of a portion of the control mechanism of FIG. 1.

Referring to FIGS. 1, 2 and 5, FIG. 1 illustrates a front view of a card-reading mechanism embodying the present invention, FIG. 2 a sectional view, and FIG. 5 an end view. A front cover is broken away so that the operating mechanism may be shown in FIG. 1. The mechanism controls the position and senses the information punched in a card placed therein. Punched cards are inserted one at a time into a card way or slot 10, FIG. 5, extending downwardly from the face of a guide plate 10*a* so that the card initially is positioned as indicated by the dotted outline 11, FIGS. 1 and 2. The card is to be moved step-wise in the direction of arrow 12. During the time intervals between steps, the presence or absence of a hole at a zone in each information column on the face of the card is sensed. Such information is transmitted from the card-reading mechanism to peripheral utilization units (not shown) and may also be employed to control the card reader itself.

For the purpose of the present invention it will be assumed that the card 11 will be moved through the slot and into a holder 13 in equal steps. Provision is made for accurately aligning the card at the end of each step with a column of reading figures which extend through slots located in a columnar reader 14 located along a line 14*a*. Such fingers may transversely penetrate the slot 10. In FIG. 2 the position of the card 11 is shown at the point of entry with the leading edge thereof approaching reader 14. The ends of the two fingers extend into each of the slots along line 14*a* which are adapted to be moved therethrough to engage the face of the card 11 or to extend through a hole punched at a given card location, as the case may be.

The invention will now be described primarily with respect to three cooperative functions. The first relates primarily to the card drive. The second relates primarily to card reading. The third relates primarily to synchronized control.

*Card Drive*

A motor unit 20, FIG. 1, is mounted on a base plate 21. The motor unit 20 is a fractional horsepower induction motor adapted to provide a uniform output speed. Mechanical power from motor 20 as on shaft 22 is coupled by way of a pulley 23 and a belt 24 to a drive pulley 25. Pulley 25 is mounted on shaft 26. Shaft 26 is coupled to a shaft (not shown) extending parallel thereto and positioned therebelow. Rotational motion of shaft 26 is applied to a cam 27 by way of a shaft which has its axis at point 28. Cam 27 is adapted to move a ratchet crank arm 29. Crank arm 29 has a pawl 30 at the end thereof which engages the teeth of a sprocket gear 31. The sprocket gear 31 is mounted on shaft 32 which is parallel to shaft 26 and to the axis 28. A second arm 34 is pivoted on a shaft 33 and has a pawl at the end thereof which engages the teeth of the gear 31. Rotation of the cam 27 serves to actuate the crank arm 29 so that the ratchet wheel 31 is moved step-wise in the direction of arrow 35. As the crank arm 29 steps from one tooth back to another preparatory to stepping the ratchet gear 31 ahead, the cam 27 permits the arm 34 to be urged into engagement with the ratchet gears at the bottom thereof under the control of the force developed by a spring 36 which interconnects the crank arm 29 and the crank arm 34. Thus shaft 32 is driven in an intermittent rotational motion under the uniform drive provided by motor 20.

The stepped motion developed on shaft 32 is utilized to drive the card 11 from the input location to an output location as shown in FIG. 2. The shaft 32 extends through the wall 75 in which the row of reading slots 14 is formed. On the side of the wall 75 opposite the gear 31 a sprocket wheel 38 is mounted on shaft 32. A sprocket chain 39 is supported over and driven by the sprocket wheel 38. The chain 39 extends over a large sprocket wheel 40 which is mounted on a shaft 41. The chain 39 also extends over an idler sprocket 42 which is mounted on a shaft 43. The shaft 43 may be adjustably positioned in a slot 44. Thus the chain 39 traveling in the direction of arrow 45 traverses the length of the slot in which the card is placed along an angular path which is determined by the relative diameters of the sprocket wheels 38 and 40 and the positions of the shafts 32 and 41, respectively.

The slot 10 in which card 11 is positioned has a fixed bottom plate 50 on which the lower edge of the card 11 rests as it is moved along the length of the slot 10. The sprockets 38, 40 and 42 are mounted in a recess whose outline is indicated by the reference character 51. The outer face of the sprockets 38, 40 and 42 is positioned closely adjacent the boundary of slot 10 and is but slightly recessed so that no contact is made by the sprocket wheel 40 or by the sprocket chain 39. The chain 39 is provided with a plurality of spaced pins. Preferably the chain is a flat link chain having parallel bars at opposite sides of the sprockets with bearing pins extending therebetween. The pins carry sleeves which serve to space the side bars and which seat in the troughs of the sprocket wheels. Selected ones of the pins extending through the linkages and carrying bearing sleeves are so designed that card-engaging elements may be mounted at a plurality of points along the length of the chain.

Figure 3:
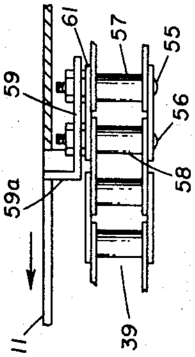
FIG. 3 is an enlarged view of a section of the card-propelling chain.
Figure 4:
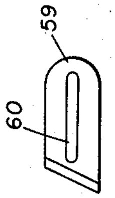
FIG. 4 is an enlarged view of a card-engaging element.

In a preferred embodiment of the invention the card-engaging element 59, FIG. 3, is formed from an angle member and is mounted on bolts 55 and 56. The bolts 55 and 56 replace a pair of adjacent pins and extend through adjacent bearing sleeves 57 and 58. Bolts 55 and 56 are provided with threaded ends which pass through the member 59. As shown in FIG. 4, the member 59 has a slot 60 extending substantially the entire length of the long side of the angle so that the bolts 55 and 56 extend through the same slot. The slot 60 is longer than the spacing between bolts 55 and 56 so that the card-engaging portion 59*a* may be shifted in its position relative to the chain 39. By this means, for a given position of chain 39, a precise alignment may be established as between the card 11, FIG. 2, and the columnar reader 14.

It is to be appreciated that while the zones in the card along which holes may be punched may be accurately positioned relative to one another, the step-wise movement of the card 11 may involve slight misalignment whereupon the reading fingers in the reader 14 will not carry out the reading function. Thus, adjustability of the member 59 along a carrier such as chain 39 having lateral rigidity has been found to be most desirable. The sprocket chain 39 provides the necessary rigidity by the use of the pins and bolts extending therethrough to maintain the card-engaging portion 59*a* fixed with respect to the chain.

It will be recognized that while two bolts 55 and 56 have been illustrated as engaging the member 59, a single bolt cooperating with a channel-type member 59 which would encompass the link 61 would be suitable and could be adjustable through the use of a slotted portion as illustrated in FIG. 4 without the necessity of using the two bolts. In either event applicant provides an accurate positioning system for the card 11 as it travels through the slot 10, FIG. 3.

Power for driving motor 20 is applied to the card-reading mechanism by way of a plug 70. Control of such power is effected by way of a push button switch 71 which is mounted on a bracket 72, shown partly broken away in FIG. 1. Bracket 72 also carries a multiterminal plug unit 73 which, as hereinafter described, is employed in connection with the reading functions of the machine.

In order to sense the presence of a card and to initiate stepping operations, a microswitch 74 is mounted on the central plate 75 which forms one wall of the slot 10. Switch 74 is actuated under the control of a lever 76 which has an extension penetrating into the card slot 10 by way of an elongated opening 77 in the wall 75. In FIG. 2 the opening 77 with an extension 76*a* of lever 76 may be seen. When the card 11 is dropped into the slot 10, the lever 76 is moved down so that the extension 76*a* is positioned at the bottom of the opening 77. By this means there may be developed a control function through the closure of switch 74 which may be utilized in associated apparatus related to the card-reading mechanism to indicate that a card is in the slot and thereby condition the associated apparatus for receiving data from the card.

Figure 7:
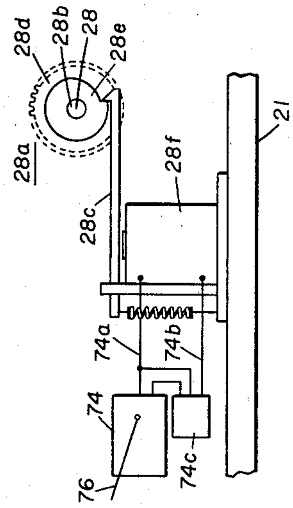
FIG. 7 is a detailed view showing a clutch control unit.

In a preferred embodiment of the invention, the linkage between the shaft 26 and the shaft 28*b* centered along axis 28 includes a clutch 28*a* which is shown in the detailed view of FIG. 7. Power is transmitted from the shaft 26 to the clutch 28*a* by means of a gear 28*d*. The motion of the gear is to be transmitted to shaft 28*b* through the clutch mechanism. A cam 28*e* is mounted on the shaft 28*b* and is frictionally coupled to the gear 28*d* by means not shown. The clutch 28*a* is controlled by a switch 74. When the switch 74 is open, that is with the arm 76 in the upper position, the clutch pawl 28*c* engages the cam 28*e* to lock the shaft 28*b* and prevent rotation thereof. When the switch 74 is energized with the arm 76 in the lower position, then the arm 28*c* is retracted to disengage it from the cam 28*e*. When this is done, the rotational motion introduced by way of the gear 28*d* is transmitted to the shaft 28*b* to initiate operation of the pawls 29 and 32 to step the sprocket gear 31. The circuit from the switch 74 is connected to the relay coil 28*f* by way of conductors 74*a* and 74*b* with current for operating the relay coil 28*f* being derived from a unit 74*c* which may include a current source and a timer or control means to maintain the clutch 28*a* energized until the card 11 has completed its journey through the machine.

The shaft 41 on which the sprocket 40 is mounted extends through a bearing (not shown) in the plate 75 and carries a cam unit 79, FIG. 5, which serves periodically to engage the arm 80 which is connected to an arm 81. Arm 81 is pivoted in a hinge structure 82 which is mounted on the plate 75. The downturned portion 83 extends through holes in the hinge 82 and is encompassed by a spring 84 which serves to bias the arm 81 towards the plate 75. The end of the arm 81 opposite the hinge 82 extends through a slot 85 and periodically is permitted to make a traverse through the slot 85 to move each card as it reaches the output location from a position in contact with the surface of plate 75 and aligned with slot 10 to a laterally spaced position in a card-receiving bin 13. The arm 81 moves under the resilient force developed by the spring 84 and is operative at the end of each cycle of card movement.

A given cycle for reading one card involves the following: A card 11 is dropped into the slot 10. This actuates the arm 76 to close switch 74. In response to switch 74 motion is applied from shaft 26 to the cam 27 which steps the sprocket 31 at uniform time intervals under the power from motor 20. Element 59 engages the trailing edge of the card 11 to move the same. At the end of each step as the successive zones on card 11 are moved into registration with the row of slots 14, FIG. 2, the presence or absence of a hole in the card 11 at any of the twelve positions is detected as will hereinafter be described. As the card 11 reaches an output location at the end of its traverse through the card reader, the arm 85 is actuated to move the card out of alignment with the slot 10 and into a card bin 13.

*Card reading*

Illustrated in FIG. 1 are twelve bars 101–112 which are mounted cantilever-fashion in a block 113. The block 113 is mounted on the face of the plate 75 opposite the card-carrying slot 10. Each of the bars 101–112 is bifurcated and has two tines extending from the block 113 towards line 14*a* of card-reading slots. The ends of the bars 101–112 opposite the block 113 overlie a conductive bar 114. The bar 114 is connected to an electrical ground with the ends of the bars 101–112 mounted in the insulating block 113. A contact between any one of the tines of the bars 101–112 and the bar 114 will produce a signal in the circuit connected to a given bar. The bars 101–112 also overlie an insulating control rod 115 which is operated by a pair of crank arms 116 and 117. The crank arms 116 and 117 are operated in the interval between the steps taken by card 11 so that the ends of the bars 101–112 will be lowered towards the contact bar 114.

Under each of the tines of the bars 101–112 there is provided a pair of fingers which extend through the slots along the line 14*a*, FIG. 2. The passage of either of the two fingers through a given slot in a card will permit one of the tines to be lowered into contact with the bar 114. The bars 101–112 are resilient and tend to urge the fingers through the slots in row 14 and against the surface of a card when the crank arms 116 and 117 are actuated.

It will be noted that the crank arms 116 and 117 are mounted on a shaft 118. The lower crank arm 116 carries a cam-engaging roller 120. A spring 121 is locked under an end of the crank arm and tends to urge the crank arms away from the plate 75 thus maintaining the bars 101–112 from engaging the fingers extending through the slots. A cam (not shown) carried by the shaft 28*b* on axis 28 is actuated once for each step of the crank arm 29 to lower the bars 101–112 onto the respective fingers. Electrical circuits extend from each of the bars 101–112 to plug 73 as indicated by the cable 122. Output signals are thus provided which are keyed to the two dimensions of the location of a given hole in card 11.

*Synchronized control*

Referring again to FIGS. 1, 5 and 6, it will be seen that the shaft 41 carries a disk 130 on which there is deposited a conductive sheath suitably formed to serve as a commutator. As best shown in the enlarged view of FIG. 6, a section of the commutator includes an inner ring 131, a central ring 132 and an outer ring 133. Rings 131 and 132 are connected together electrically as by segments 134 and 135. Similarly, the rings 132 and 133 are connected together by spaced segments 136 and 137.

The spacing between adjacent segments such as segments 134 and 135 is of the order of twice the angular motion of shaft 41 for the movement of card 11 through one step. A similar spacing is provided as between the segments 136 and 137. It will be noted that the segments 134 and 135 are staggered with respect to segments 136 and 137. Thus, there is one segment for each step of the card 11. A first set of brushes is provided for making electrical contact with the rings and intermediate segments. As indicated in FIG. 5, the brushes 140–144 are mounted in an insulating standard 145 which is fastened to the base plate 21. As seen in FIG. 6, brush 140 maintains a continuous contact with the inner ring 131. The brush 141 is adapted to contact each of the segments 134, 135, etc. Brush 142 maintains a continuous contact with the central ring 132; the brush 143 is adapted to contact each of the segments 136, 137; and brush 144 maintains continuous contact with the outer ring 133. The segments 134, 135, 136 and 137 are so dimensioned and are located so that either brush 140 or brush 143 always will be in contact with one of the segments. That is to say, brush 140 will not move from a segment onto an insulating section of the disk 130 before the brush 143 moves from an insulating segment to one of the conductive segments. The location of each of the segments such as segment 134–137 corresponds with the location on the card 11 of a card information column. Thus there is one segment in the commutator for each card column.

Punched cards are provided in one standardized form having dimensions 7⅜″ long, 3¼″ wide and 0.0065″ thick. Various makes of cards employ different numbers of information columns. The actual card may be between 86 and 87 columns in length but a lesser number of columns is actually used. In any case there would be provided segments in number sufficient in total to equal the length of the card so that one rotation of the disk 30 corresponds with the movement of a card from one end to the other past the line 14*a*. The brush 141 is connected by way of conductor 150 to one terminal of a relay 151 and to brush 143. The second terminal of relay 151 is connected by way of a battery 152 to the brush 142. Conductor 150 is also connected to one input of a second relay 153. The second terminal of relay 153 is connected by way of battery 154 to each of the brushes 140 and 144. Relay 151 is provided with an output circuit 155 which is either opened or closed depending upon the condition of the commutator disk 130. The relay 153 has an output circuit 156 which may similarly be conditioned.

In operation, it is desired to produce a control function in the output circuit 155 corresponding with the card location represented by the segment 136. The segment 136 would be isolated from the adjacent rings 132 and 133 by the removal of end portions of the segment 136. The segments are provided with zones of reduced width so that they may be conveniently removed. When this is the case and when the disk 130 is positioned relative to the brushes 140–144 as illustrated in FIG. 6, the circuit from both batteries 152 and 154 is broken so that the switches in circuits 155 and 156 will be opened, thereby to produce an output function which may be utilized for operation of the card-reading mechanism or for associated system components. However, as long as the segments 134–137 and additional segments in each of the two rings of segments are unaltered, current will continue to flow in the relays 151 and 153 to maintain the circuits closed.

The commutator may be programmed for various modes of operation by the selection of segments at which a control function is to be produced. It is to be understood that it may be desirable to produce a control function when a given card information column is centered on the line 14*a* or it may be desired to produce a control function in a half-column space, that is, when adjacent card information columns are half-way between registration with the line 14*a*. When this is the case, a second set of brushes such as the brushes 160–164 will be provided with the spacing thereof relative to the brushes 140–144 equal to a whole number of spacings between adjacent segments plus one half space. A set of circuits operative under the control of the brushes 140–144 may thus be employed for additional control purposes.

It will be understood that the commutator may consist only of two rows of segments connected to the central ring 132. When such construction is employed, the control functions above described could be carried out. However, it has been found desirable to utilize the three rings 131, 132 and 133 in order to provide flexibility in selecting the programs which will be employed through the use of the commutator.

Furthermore, it will be understood that a pair of rings such as rings 131 and 132 could be employed with a single ring of commutator elements such as the elements 134 and 135 where commutator elements in number equal to the number of spacings on the card would be provided. However, in order to conserve space and still permit utilization of components of workable dimension, two rows of commutator segments together with three commutator rings have been employed in a preferred embodiment of the invention.

The movement of the commutator disk 130 is synchronized, moving step-wise along with the ratchet wheel 40 so that the position of the disk 130 corresponds step-for-step with the movement of the card 11 through the slot 10. At any point of registration between the line 14*a* and the card 11 a control function may be produced which is accurately synchronized both as to space or time with the card itself.

Referring again to FIG. 5, it will be noted that the disk 130 is mounted on shaft 41 by means of a hub plate 131*a*. The disk 130 is formed from a disk of insulating material such as phenolic or epoxy resin or the like. From such disk all copper except the desired conductive commutating segments are removed by a photo-etching process. Following this, a nickel plating or a rhodium plating is flashed onto the copper elements.

The brushes 140–144 may be of material such as beryllium copper either in a solid or brush form to maintain contacts with the conductive elements on the plates 130*a*.

The following functions are representative of uses of the commutator:

(1) The machine may be started and stopped at any card position in response to the commutator;

(2) The commutator may serve to shift an associated typewriter carriage or to change from lower to upper case type;

(3) The commutator may control the reading operations or may provide for the discontinuance of reading operations at any card position.

From the foregoing it will be seen that the present invention provides for an accurate control in the alignment of information columns on an information card with a column or reader in the machine. The motion of the card as it travels through the reading machine is in discrete steps with the reading function being performed intermediate the steps and while the card is at rest.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a card-reading mechanism having a columnar reader including fingers for sensing perforations in each of a plurality of card information columns as a card is moved along a way past said reader the combination which comprises a plurality of card-propelling elements adapted to engage the trailing edges of cards placed in said way, a carrier mounted for movement adjacent to one side of said way as to have a component of movement parallel to the length of said way, means for advancing said carrier in uniform steps, and independently adjustable mounting means at each of a plurality of spaced points along said carrier for mounting said elements on said carrier in predetermined positions relative to said columnar reader.

2. In a card-reading mechanism having a columnar reader including fingers for sensing perforations in each of a plurality of card information columns as a card is moved along a way past said reader the combination which comprises a plurality of card-propelling elements adapted to engage the trailing edges of cards placed in said way, a chain mounted for movement adjacent to one side of said way as to have a component of movement parallel to the length of said way and a component perpendicular to said way, independently adjustable mounting means at each of a plurality of spaced points along said chain for mounting said elements on said chain, and means for advancing said chain in uniform steps to move said elements along said way.

3. In a card-reading mechanism having a columnar reader including fingers for sensing perforations in each of a plurality of card information columns as a card is moved along a way past said reader the combination which comprises a plurality of card-propelling elements adapted to engage the trailing edges of cards placed in said way, a sprocket chain, a plurality of sprocket wheels supporting said chain adjacent to one side of said way for moving said chain along a path as to have a component of movement parallel to the length of said way, and a component perpendicular to said way, adjustable mounting means at each of a plurality of spaced points along said chain for mounting said elements on said chain, and means for advancing said chain in uniform steps to move said elements along said way.

4. In a card-reading mechanism having a columnar reader including fingers for sensing perforations in each of a plurality of card information columns as a card is moved along a way past said reader the combination which comprises a prime mover for producing intermittent rotational motion of uniform steps, a plurality of card-propelling elements adapted to engage the trailing edges of cards placed in said way, a sprocket chain, a plurality of sprockets supporting said chain mounted adjacent to one side of said way, a linkage between said prime mover and one of said sprockets to move said chain in uniform steps along a path having a component of movement parallel to the length of said way, and independently adjustable mounting means at each of a plurality of spaced points along said chain for mounting said elements on said chain.

5. In a card-reading mechanism having a columnar reader including fingers for sensing perforations in each of a plurality of card information columns as a card is moved along a way past said reader the combination which comprises a plurality of card-propelling elements adapted to engage the trailing edge of cards placed in said way, a continuous sprocket chain mounted for movement adjacent to one side and parallel to said way, said chain having bearing pins which at points spaced one from another along the length of said chain extend toward said way to support said elements at spaced locations therealong, means for advancing said chain in uniform steps, and means for independently adjusting the positions of said elements on said pins to predetermine the positions of said elements in said way relative to said reader at the end of each step thereof.

6. In a card-reading mechanism having a columnar reader including fingers for sensing perforations in each of a plurality of card information columns as a card is moved along a way past said reader the combination which comprises a plurality of card-propelling elements adapted to engage the trailing edges of cards placed in said way, a continuous sprocket chain mounted for movement adjacent to one side and parallel to said way, said chain having bearing pins which at points spaced one from another along the length of said chain extend toward said way to support said elements at spaced locations therealong, means for advancing said chain in uniform steps, means for independently adjusting the positions of said elements on said pins to predetermine the positions of said elements in said way relative to said reader at the end of each step thereof, and means for adjusting the angularity of the travel path of said propelling elements through said way so that the component of movement in the direction of card travel equals the spacing between said information columns.

7. A drive means for moving a card relative to a columnar reader which senses information in each of a plurality of laterally disposed card information columns, which comprises:

(a) structure forming a document way including a floor and a pair of spaced apart vertical side walls for confining said card for travel in a vertical orientation with the bottom edge thereof in contact with the floor of said way, (b) a guide channel formed in one of said side walls angularly extending therealong from an input point downward toward said floor and forward toward said reader, (c) a continuous driver mounted in a path consisting of said channel and a return course external to said way, (d) a plurality of card propelling elements for engaging the trailing edge of each said card placed in said way, and (e) adjustable mounting means at each of a plurality of spaced points along said driver for mounting said elements on said driver in predetermined positions relative to said reader thereby to apply a moving force to each card at a contact point which continuously changes with movement of said card through said way from an upper region to a lower region along the trailing edge of each card.

8. A drive means for moving a card relative to a columnar reader which senses information in each of a plurality of laterally disposed card information columns, which comprises:

(a) structure forming a document way including a floor and a pair of spaced apart vertical side walls for confining said card for travel in a vertical orientation with the bottom edge thereof in contact with the floor of said way, (b) a guide channel formed in one of said side walls angularly extending therealong from an input point downward toward said floor and forward toward said reader, (c) a segmented chain drive element mounted in a path consisting of said channel and a return course external to said way, (d) a plurality of card propelling lugs having a face for engaging the trailing edge of each said card placed in said way and a slotted flange, (e) a connector means extending laterally from said chain at each of a plurality of points uniformly spaced along the length thereof for engaging one of said lugs in the slotted flange thereof thereby to provide a lug mounting which is adjustable longitudinally of said chain for application of a moving force to each card at a contact point which continuously changes with movement of said card through said way from an upper region to a lower region along the trailing edge of each card.

References Cited by the Examiner

UNITED STATES PATENTS

| | | | |
|---|---|---|---|
| 757,667 | 4/04 | Mayall | 271—45 |
| 1,765,419 | 6/30 | Goss | 271—45 |
| 2,614,632 | 10/52 | Clos | 235—61.113 |
| 2,847,113 | 8/58 | Dumas | 198—135 |
| 2,943,726 | 7/60 | Granath | 198—135 |

MALCOLM A. MORRISON, *Primary Examiner.*

WALTER W. BURNS, Jr., *Examiner.*